United States Patent [19]

Kurihara et al.

[11] 4,387,024

[45] Jun. 7, 1983

[54] HIGH PERFORMANCE SEMIPERMEABLE COMPOSITE MEMBRANE AND PROCESS FOR PRODUCING THE SAME

[75] Inventors: Masaru Kurihara, Ohtsu; Tadahiro Uemura, Kyoto; Kiyoshi Okada, Kusatsu, all of Japan

[73] Assignee: Toray Industries, Inc., Tokyo, Japan

[21] Appl. No.: 103,369

[22] Filed: Dec. 13, 1979

[51] Int. Cl.³ .............................................. B01D 31/00
[52] U.S. Cl. ................................. 210/490; 210/500.2; 427/245
[58] Field of Search .............. 210/23 H, 28 F, 433 M, 210/321 R, 500 M, 654, 490; 428/304; 264/41; 427/244, 245, 246

[56] References Cited

U.S. PATENT DOCUMENTS

| | | | |
|---|---|---|---|
| 3,367,504 | 2/1968 | Westmoreland | 210/321 |
| 3,397,790 | 8/1968 | Newby et al. | 210/321 |
| 3,417,870 | 12/1968 | Bray | 210/321 |
| 3,696,031 | 10/1972 | Credau et al. | 210/23 H |
| 3,996,318 | 12/1976 | Heuven | 210/23 H X |
| 4,005,012 | 1/1977 | Wrasidlo | 210/23 H |
| 4,244,817 | 1/1981 | Yaginuma | 210/654 |

Primary Examiner—Frank A. Spear, Jr.
Attorney, Agent, or Firm—Austin R. Miller

[57] ABSTRACT

A high performance semipermeable composite membrane containing a microporous substrate having a semipermeable membrane on the surface thereof. A composite ultrathin solute rejection barrier is formed on an intermediate transport layer which in turn is formed on a substrate.

A mixture of a water soluble organic polymer having reactive amino groups in terminal and/or side chains, together with a monomer or monomeric polyamine is reacted with an agent having a polyfunctional group.

29 Claims, 4 Drawing Figures

HIGH PERFORMANCE SEMIPERMEABLE COMPOSITE MEMBRANE AND PROCESS FOR PRODUCING THE SAME

This invention relates to a high performance membrane and to a process for producing the same, and relates particularly to a novel and highly advantageous semipermeable composite membrane having a high percentage solute rejection and which is especially useful for production of pure water from sea water, which is useful for recovery of valuable materials, and which has excellent resistance to degradation in the presence of chlorine.

BACKGROUND OF THE INVENTION

In recent years liquid separation and purification systems utilizing reverse osmosis have been applied in many fields such as the desalination of sea water or other saline waters and in the recovery of valuable materials from waste liquids of various types.

Various semipermeable membranes are now being used in commercial reverse osmosis treatments of aqueous solutions, either for water purification or for concentration of liquid solutions, or both. Such semipermeable membranes include the early Loeb type membranes made of cellulose acetate by processes as described in U.S. Pat. Nos. 3,133,132 and 3,133,137. The Loeb type membranes are asymmetric types and are characterized by a very thin, dense surface layer or skin that is supported upon an integrally attached, thicker supporting layer. However, the cellulose acetate Loeb type membranes are restricted as to use and as to processability, largely because the membranes must be kept wet at all times; their effectiveness as reverse osmosis membranes is lost once the membranes are dried.

These membranes have also exhibited deficiencies such as alkaline or acidic degradation and biological degradations which result in short life. Furthermore, these membranes are not used widely in separation or recovery of valuable materials from liquid mixtures containing organic chemicals, because the membranes have low selectivity for valuable organic materials and poor resistance to the effects of organic solvents.

Other Loeb type membranes which are also used include membranes fabricated from polyamides (please refer to U.S. Pat. No. 3,567,632, for example), polyamide hydrazide, polyamide acid (Japanese Patent Publication No. 50-121, 168), crosslinked polyamide (Japanese Patent Publication No. 52-152,879), polyimidazopyron, polybenzimidazole, polysulfonamide, polybenzimidazolon, polyaryleneoxide, polyvinylmethylether, polyacrylonitril, polyvinylalcohol, polyhydroxethylmethacrylate and polyvinylidinechloride, etc. However, the separation performances and the resistances to chemical degradation of these Loeb type membranes are all inferior to those of the cellulose acetate membranes.

When utilizing the semipermeable membranes in the treatment of brackish water, particularly the treatment of sea water, it is often necessary to treat the feed materials with chlorine or other oxidizing agents so as to guard against bacterial growth which could greatly deter the performance of the membranes as a result of fouling or the like. Therefore, this chemical degradation in the membranes results in too short a useful life, with accompanying too-low salt rejection, which results in an inefficient operation.

In a later development, processes have been provided for preparing an ultra-thin film or skin separately from a porous supporting layer.

Membranes so prepared have become known as composite membranes. In preparing such membranes it is possible to tailor both the ultra-thin film and the porous supporting layer in such a manner that each component possesses the most desirable properties. Processes for preparation of composite membranes are described in U.S. Pat. Nos. 3,744,642 and 3,926,798 and in Publication Board Reports Nos. 234,198 and 248,670 published by the National Technical Information Service, U.S. Department of Commerce.

Generally, these composite membranes have also exhibited deficiencies such as compaction resulting in short life, as well as undesirably low flux or solute rejection, all resulting in inefficient operation.

SUMMARY OF THE INVENTION

It is an object of this invention to provide a semipermeable composite reverse osmosis membrane which provides at least 99.5% of solute rejection and has excellent resistance to chlorine. Another object of this invention is to provide a composite membrane which is not only capable of production of pure water from sea water but is useful for the recovery of valuable materials from the water as well. A further object of this invention is to provide a method for making such a composite membrane which can be produced in simple steps which lends itself favorably to commercial production.

Yet another object is to provide a method of controlling membrane thickness of an ultrathin membrane to thereby provide membranes of predetermined thickness ideally adaptable for usage under a wide variety of pressure conditions in service.

Other objects and advantages of this invention will appear in further detail hereinafter.

DETAILED DESCRIPTION OF THE INVENTION

Figure 1:
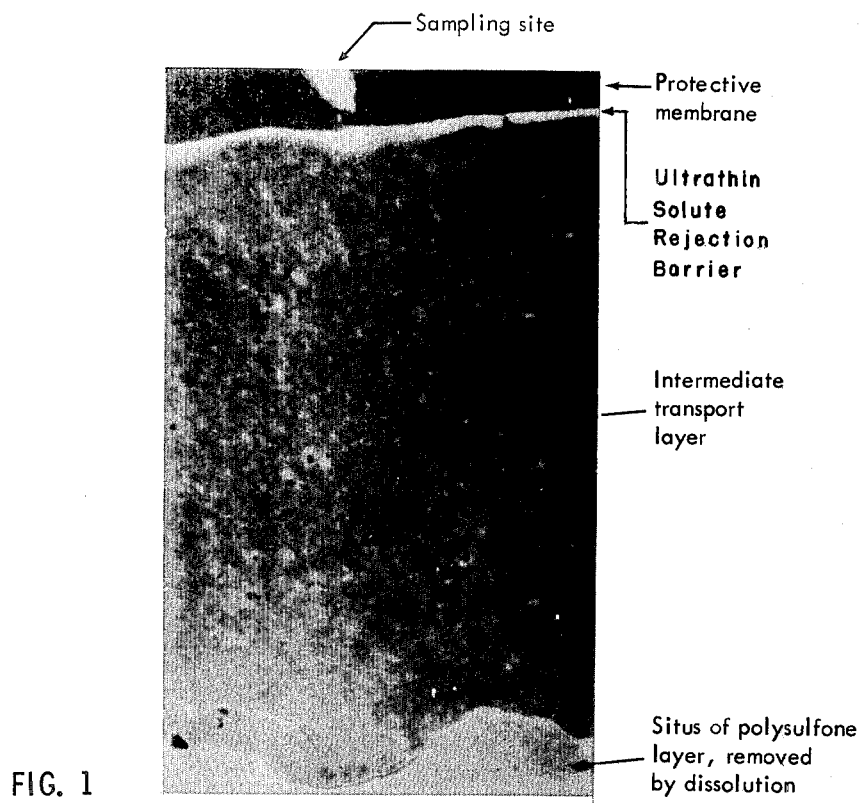
FIG. 1 is an electron microphotograph showing the fine structure of an ultrathin cross-section of a semipermeable composite membrane in accordance with the invention.

In accordance with this invention, a semipermeable composite membrane is provided comprising a microporous substrate and a semipermeable membrane formed on a surface of the microporous substrate. The semipermeable membrane is composed of a crosslinked polymer made by reacting (a) a mixture containing a water soluble organic polymer having reactive groups in terminal and or side chains of the organic polymer, said mixture also containing a reactive monomer or amine, with (b) a crosslinking agent having a polyfunctional group capable of reacting with the reactive groups of the water soluble organic polymer and also of reacting with the monomer or polyamine contained in the mixture (a). The mixtures (a) and (b) are essentially immiscible with one another whereby interfacial polymerization takes place among the water soluble organic polymer, the monomer or amine, and the crosslinking agent to form an ultrathin layer. At the same time, some of the monomer or amine migrates through the ultrathin layer and polymerizes with the crosslinking agent to form an outer, crosslinked or non-crosslinked polymeric ultrathin outer portion on the aforementioned ultrathin layer.

By performing the polymerization of the water-soluble polymer in an interfacial manner the resulting polymer forms an ultrathin solute rejection barrier of surprising uniformity with respect to thickness. Further, by predetermining the amount and type of monomer or polyamine present in the aqueous polymer solution the amount penetrating through the aforesaid ultrathin barrier is also predetermined, and this predetermines the thickness of the further ultrathin barrier portion that will be produced from polymerization of the monomer or polyamine with the crosslinking agent. In this surprising and highly effective manner the overall thickness of the ultrathin solute rejection barrier can be accurately predicted, and the uniformity of thickness of the resulting barrier is entirely unprecedented.

Thickness control is highly important because solute rejection barriers are utilized under various pressures in different fields of service. Where low values of solute rejection are sufficient, very thin barriers (100 Å or less) may be used at low pressure. On the other hand, barriers as thick as 1,000 Å or more may be provided in accordance with this invention, and these may be used under very high pressure with adequate solute rejection performance.

Examples of water soluble organic polymers which are useful in the practice of this invention include amine modified polyepihalohydrin, polyethyleneimine and polyepiaminohydrin, preferably, water soluble reaction products which are obtained by reacting an amine compound with a polyepihalohydrin represented by the following Formula I:

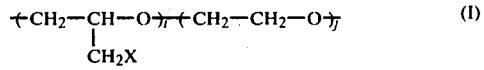
(I)

wherein X is a halogen atom such as Cl, Br or I, and i and j are mole fractions and satisfy the following relations:

$i+j=1$ $0 < i \leq 1$ $0 \leq j \leq 0.8$

The amine compound (II) which is used with the organic polymer in the practice of this invention preferably fulfills the following requirements:

(II) It is a non-cyclic or cyclic monomeric polyamine containing:
(1) from 0 to 1 amino group;
(2) more than one imino group and
(3) the sum of the amino and the imino groups is more than two, wherein the amino group, if present, is bonded to a carbon atom or to two different carbon atoms, the total number of carbon atoms being 3 to 12.

Examples of polyepihalohydrins represented by Formula (I) include polyepichlorohydrin, polyepibromohydrin and polyepiiodohydrin. Examples of the polyamines (II) include piperazine, 2,5-dimethylpiperazine, 4-aminomethylpiperizine, 3-aminohexahydroazepine, 3-methylaminohexahydroazepine, monomethylethylenediamine, N,N-dimethylethylenediamine and mono-N-methyldiethylenetriamine.

These polyepihalohydrins may be modified by reacting them with the aforementioned amine compounds according to the procedure well known in prior art, for example, as described in U.S. Pat. No. 4,056,510. Examples of polyamines being mixed with water soluble organic polymers having amino groups are preferably the aforementioned amine compounds, although other polyamines such as ethylenediamine, diaminopropane, diaminobutane, diaminopentane, diethylenetriamine, dipropylenetriamine, triethylenetriamine, pentaethylenehexamine and the like may also be used.

The mixture used for preparing the composite membrane of this invention is obtained by mixing the polyamine and the water soluble organic polymer having amino groups with each other. However, an amine modified polyepihalohydrin containing unreacted monomeric polyamine should be used, so that the reaction mixture of the polyepihalohydrin contains excess polyamine.

The mix ratio of the polymer with the polyamine is about 10% to 90% by weight of polyamine in 90 to 10% by weight of polymer, preferably from about 20% to 85% by weight of polymer and about 80% to 15% by weight of polyamine. When the mix ratio is substantially outside the 90%–10% ratio, the resulting composite membrane shows lower solute rejection or lower flux.

As will be described hereinafter, the semipermeable composite membrane of this invention comprises two crosslinked polymers, one is obtained by reacting the mixture with a polyfunctional reagent and another is obtained by heat-crosslinking of the water soluble polymer. The semipermeable composite membrane obtained from the crosslinked polymers have the fine structure of a two phase system, that is, an ultrathin solute barrier layer and an intermediate transport layer.

It is considered that the ultrathin solute barrier layer which determines and controls the solute rejection or permeability of the composite membrane, and that the intermediate transport layer is the layer adhering the ultrathin solute barrier to the microporous substrate.

When a membrane is prepared by using only the polyamine, a fine structure attributable to the use of the two phase system does not form in the resulting semipermeable membrane, and the composite membrane does not have good separation performance. On the other hand, when a membrane is prepared by using only a water soluble organic polymer having amino groups (without the monomeric polyamine), the membrane formed does have the fine structure of a two phase system, but the liquid separation performance of the resulting composite membrane is poor. Further, such membranes particularly deteriorate with lapse of time, because the ultrathin solute barrier layer of the semipermeable membrane is very thin and is prone to mechanical damage.

The thickness of the ultrathin solute barrier layer and the intermediate transport layer of the membrane may be controlled in a highly effective manner by altering the mix ratio of the polyamine to the organic polymer. The performance of the composite membrane can be controlled to some degree by altering the thicknesses of the ultrathin solute barrier layer and the intermediate transport layer. The thickness of the ultrathin solute barrier layer is preferably within the range of about 10 Å to about 1,000 Å, more preferably from about 50 Å to 500 Å, and the thickness of the intermediate transport layer is preferably in the range of about 100 Å to 3 microns, more preferably about 0.5 microns to about 2 microns. When the ultrathin solute barrier layer is less than about 10 Å in thickness, the composite membrane is prone to mechanical damage, and it is difficult to retain the separation performance of the membrane.

On the other hand, when the ultrathin solute barrier layer is thicker than about 1,000 Å, the liquid permeation of the composite membrane decreases. Furthermore, when the thickness of the intermediate transport layer is outside the above ranges, the composite membrane has reduced liquid separation performance or undergoes a performance change, because the thickness of the intermediate transport layer is somewhat prone to unevenness and irregularity on the surface of the microporous substrate.

Expressed as the sum of the thicknesses of the ultrathin solute barrier layer and the intermediate transport layer, the thickness of the semipermeable composite membrane is preferably about 100 Å to about 3 microns.

FIG. 1 is an electron microphotograph showing the fine structure of an ultrathin cross section of a semipermeable composite membrane comprising one example in accordance with this invention.

This figure clearly indicates the fine structure of the membrane surface as examined with the aid of an electron microscope. The membrane surface was shadowed with Pt–Pd and carbon in a vacuum-depositing apparatus, and the polysulfone substrate portion of the membrane was dissolved in chloroform. The membrane was embedded with an epoxy resin, dyed with an $OsO_4$ solution and was sectioned by using an ultrathin membrane with a diamond knife. The ultrathin membrane layer of approximately 300 Å thickness and the supporting layer of about 1 thickness were examined by a Hitachi HU-12 Transmission Electron Microscope.

Figure 2:
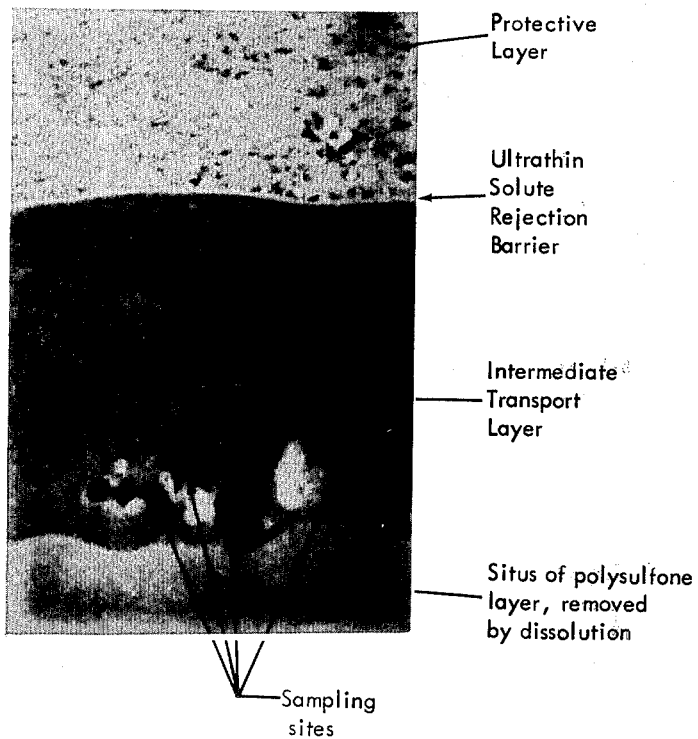
FIG. 2 is an electron microphotograph similar to FIG. 1 showing the fine structure of an ultrathin cross-section of a semipermeable composite membrane obtained by using a solution containing only the amine modified polyepihalohydrin.

FIG. 2 is an electron microphotograph similar to FIG. 1 showing the fine structure of an ultrathin cross section of a semipermeable composite membrane obtained by using a solution containing only the amine modified polyepihalohydrin. The magnifications of the microphotographs of FIGS. 1 and 2 are about 90,000 times for each. The microphotographs show that the ultrathin solute barrier layer of the membrane of FIG. 1 is significantly thicker than the ultrathin solute barrier layer of FIG. 2.

Figure 3:
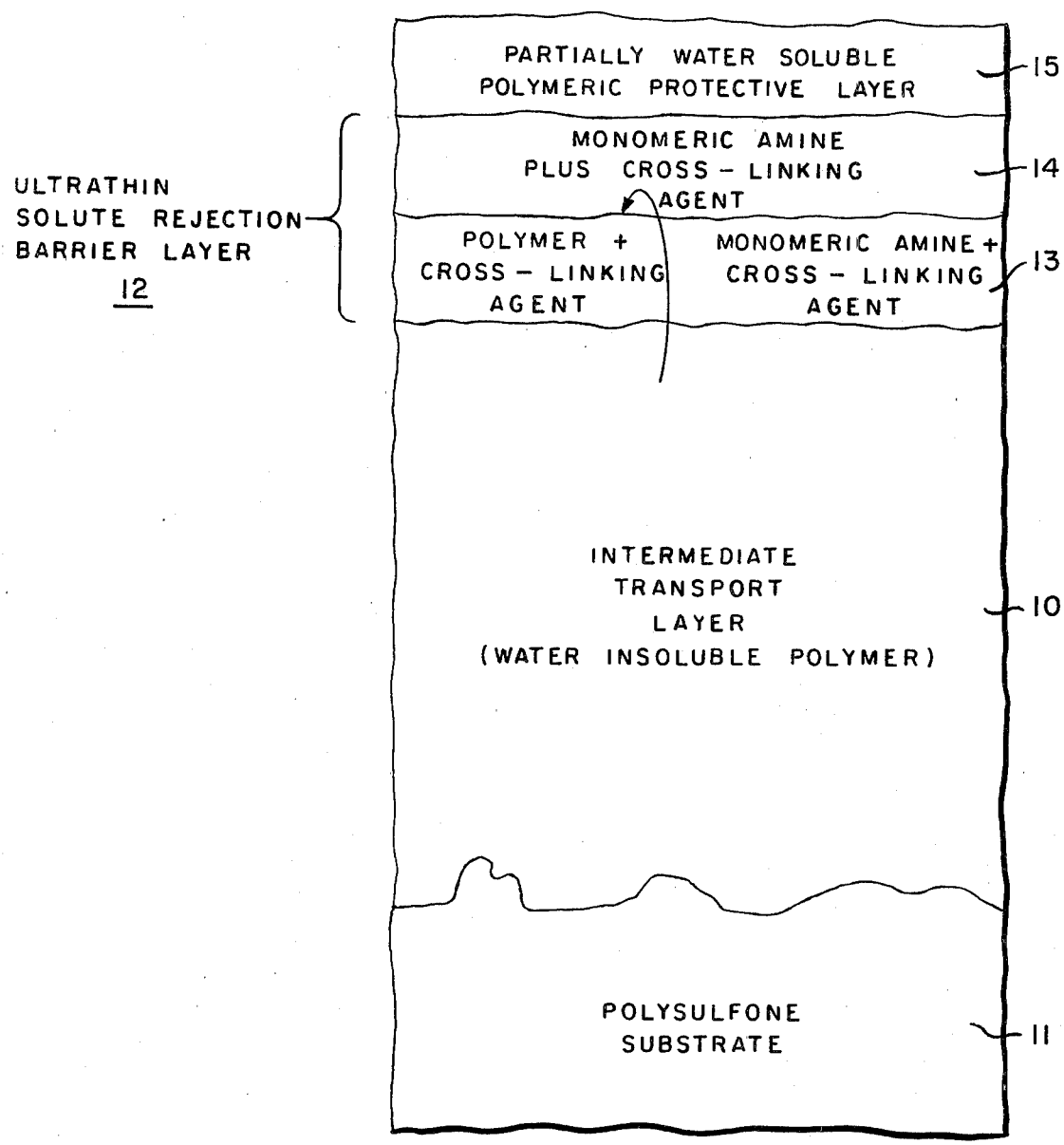
FIG. 3 is a schematic cross-sectional drawing, highly enlarged, showing further details regarding the nature of the ultrathin solution barrier layer and the manner in which it is formed.

FIG. 3 is a schematic cross-sectional drawing, highly enlarged, showing further details regarding the nature of the ultrathin solute barrier layer and the manner in which it is formed.

Figure 4:
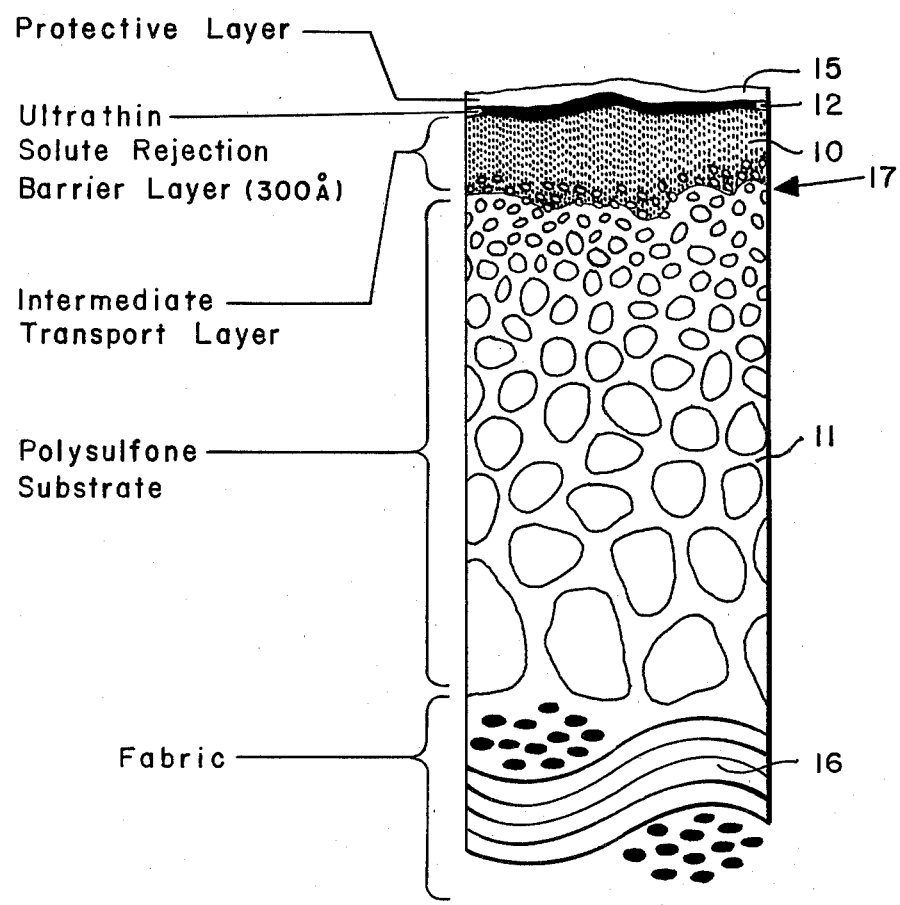
FIG. 4 is a schematic drawing similar to FIG. 1, but on a less enlarged scale showing a barrier of the present invention in combination with a polysulfone substrate and a fabric.

FIG. 4 is a schematic drawing similar to FIG. 1 but on a less enlarged scale, showing a barrier of this invention in combination with a polysulfone substrate and a fabric.

The interfacial polycondensation method, itself well known, is used for fabrication of the semipermeable composite membranes of this invention. The method has been described in great detail by P. W. Morgan in "Condensation Polymers by Interfacial and Solution Methods", Intersciences Publishers, New York, 1965.

According to this method, the aqueous mixture of the water soluble organic polymer having amino groups and the monomeric polyamine is coated on a surface of the microporous substrate; thereafter the hydrophobic solution containing polyfunctional reagents whose functional groups are capable of reacting with the amino groups is coated upon but does not mix with the aqueous solution and forms a separate layer thereon. In situ interfacial polycondensation on the microporous substrate takes place between the immiscible solutions and serves to produce an ultrathin surface coating possessing solute barrier characteristics.

Examples of polyfunctional reagents (cross-linking agents) which are useful in the practice of this invention are selected from the group consisting of the acid chlorides such as isophthaloyl chloride, terephthaloyl chloride, trimesoyl chloride, etc., of isocyanates such as toluylene diisocyanate, naphthalene diisocyanate, etc., and active halogen compounds such as cyanuric chloride, for example. They are dissolved in suitable solvents which are substantially immiscible with water, such as hexane, heptane, pentane, benzene, carbon tetrachloride, etc.

The microporous substrate may be formed as a flat sheet or as a tubular or hollow fiber, or in any other desired shape usually used for reverse osmosis separation processes, and the pores in the surface are preferably sized between about 10 Å and about 100 Å. The pores tend to become gradually enlarged toward the back (supporting substrate) side. The aforementioned microporous substrate may be distinguished as an anisotropic membrane made from homopolymers or from mixed polymers of polysulfone, chlorinated polyethylene, polyvinylchloride, cellulose acetate, cellulose nitrate, etc. The most preferable material is polysulfone. Preparation of polysulfone substrates is described in "Office of Saline Water Research and Development Progress Report" No. 359, October, 1968.

The aforementioned characteristic two phase system of the semipermeable membrane of this invention, composed of an ultrathin solute barrier layer and an intermediate transport layer can be obtained by using an aqueous solution containing a water soluble organic polymer having amino groups and a polyamine, in which the concentration of the aforementioned polymer is preferably from about 0.1% to 10% by weight, more preferably from 0.5% to 5% by weight. The concentration of the polyamine is preferably in a range of about 0.1% to 10% by weight, more preferably about 0.5% to 5% by weight. As the result of these concentrations, a two-phase system having the desired thickness can be readily and conveniently obtained. From this a composite membrane possessing excellent separation characteristics can be fabricated with good yield. By simply increasing the polyamine content in the solution the thickness of the resulting ultrathin barrier may also be increased.

The water soluble organic polymer having amino groups and the polyamine in the aqueous solution are converted to a water insoluble crosslinked polymer by interfacial reaction with the polyfunctional reagent contained in the hydrophilic phase. For this reaction one of a number of alkaline reagents, such as sodium hydroxide, potassium hydroxide, sodium carbonate, sodium bicarbonate, etc., may be added to remove byproducts of the reaction, such as hydrogen chloride, etc. Further, catalysts such as crown ethers may be used for acceleration of the reaction. On the other hand, the optimum concentration of the polyfunctional reagent in the water immiscible solution is affected by the concentration of the water soluble organic polymer having amino groups and the polyamine in the aqueous phase. The preferable concentration is between about 0.1% to 10% by weight.

The microporous substrate covered with the ultrathin solute barrier layer, formed by the interfacial condensation reaction, is the cured at a high temperature, which should not be so high as to break the microporous substrate. The temperature is preferably between 80° C. and 150° C. As a result of this curing, the intermediate transport layer of the water soluble organic polymer of the aqueous phase becomes water insoluble, forming an intermediate transport layer between the ultrathin barrier and the substrate. The semipermeable ultrathin composite membrane becomes stabilized as to durablity and separation characteristics. The ultrathin solute barrier layer is formed by an interfacial condensation between the mixture of water soluble organic polymer having amino groups and the polyamine, and the polyfunctional reagent.

When the water soluble organic polymer having amino groups is the only species in the water solution, the ultrathin solute barrier layer formed in the same manner is not more than about 100 Å in thickness. On the other hand, when the monomeric polyamine is the only species present, the ultrathin solute barrier layer attains a thickness of only a few microns as a maximum. Accordingly, the resulting semipermeable composite membranes are of only very limited use in either case.

In contemplating the nature of the interfacial reaction, and in considering the reactivity and the molecular size of the water-soluble organic polymer having amino groups and the polyamine, the ultrathin solute layer may be formed immediately after contact with the polyfunctional reagents, accompanied or followed by diffusion of the monomeric polyamine only (but not the polymer) through the ultrathin layer. Having penetrated the ultrathin layer, the monomeric polyamine reacts with the polyfunctional reagent contained in the hydrophobic phase and thus forms additional polymer which is deposited upon the ultrathin solute barrier and increases its thickness accordingly.

Because of this phenomenon, the resulting thickness of the ultrathin solute barrier layer of this invention is greater than in the case of using only the water soluble organic polymer having amino groups. Also, such layer is thinner than one produced by the use of polyamine only.

The outer protective layer later applied to the ultrathin solute barrier layer causes the composite membrane to be much more stable against mechanical shocks. Water soluble organic polymers such as polyvinylalcohol (PVA), polyvinylpyrrolidone (PVP), polyacrylamide and polyacrylic acid, for example, are useful in forming the protective layer. Addition of a polyfunctional halogenated compound to this water solution is sometimes useful for crosslinking the protective layer, resulting in good water resistance. The remaining polyfunctional reagents of the interfacial polycondensation on the ultrathin solute barrier layer are also useful for crosslinking the protective layer. The optimum thickness of the protective layer is about 0.1 mm to 20 millimeters when PVA or PVP is used.

FIG. 3 of the drawings shows diagrammatically and greatly magnified a typical structure obtained according to this invention. The intermediate transport layer 10 is composed of water-insoluble polymer formed from the water-soluble polymer of the aqueous layer which remains in place on the polysulfone substrate 11 and which was solidified and rendered water-insoluble by heating. Next to the intermediate transport layer 10 is the composite ultrathin solute rejection barrier 12; its inner layer 13 is formed by reaction of the water-soluble polymer plus the monomeric polyamine with the cross-linking agent: a cross-linked product of all three. During these reactions the monomeric polyamine also migrates in the direction of the arrow in FIG. 3 from the aqueous phase through the barrier layer 13 formed at the interface, and reacts with the cross-linking agent of the organic phase, producing the outer layer 14 of the ultrathin solute rejection barrier. This outer layer 14 is the cross-linked product of the monomeric polyamine (but not the polymer) or non-crosslinked with the cross-linking agent. The number 15 designates the outer protective layer preferably subsequently applied.

FIG. 4 shows the polysulfone substrate 11 supported by a fabric 16. This figure also shows the typically irregular surface 17 of the polysulfone substrate 11, which is difficult to coat with a uniformly thick coating. The intermediate transport layer 10 admirably compensates for this surface roughness and securely attaches itself to the polysulfone layer while also providing an excellent, much more uniform supporting surface for the ultrathin solute barrier layer 12. In this manner thickness variations of the layer 12 are minimized. For example, in a typical case a layer 12 may be provided with a maximum thickness of 500 Å and a minimum thickness of 200 Å, which is highly significant in terms of barrier performance.

The following specific Examples have been selected as illustrative of various ways in which this invention may be practiced. They are not intended to define or to limit the scope of the invention, which is set forth in the appended claims.

EXAMPLE 1

120 grams of sodium iodide were dissolved in 80 grams of hot methylethylketone. To this, 92.5 grams of polyepichlohydrin dissolved in 200 grams of methylethylketone were added, and the product was stirred at the boiling temperature for 25 hours. The resulting solution was cooled to room temperature, filtered and 3,000 grams of water were added. The precipitated polymer was washed in 500 grams of methanol and dried in vacuum at 50° C. for 10 hours to obtain a polyepiiodohydrin. 80% of chloro groups were found to be changed to iodo groups from chemical analysis. 12 grams of polyepiiodohydrin were dissolved in 100 grams of tetrahydrofuran and 10 grams of water and 35 grams of 4-(aminomethyl)piperizine were added. After stirring at 35° C. for 6 hours, sulfuric acid was added dropwise to neutralize the resultant solution. 300 grams of methanol were added to the resulting solution, and a white precipitate was obtained. This precipitate was purified by use of four reprecipitations, each from a methanol and water solution (methanol/water=3/1). The product was then passed through an anionic ion exchange resin bed to remove the sulfuric acid base, and the polymeric substance was obtained. From the results of infrared spectrum analysis and $^{13}C$ nuclear magnetic resonance, this polymer was found to be 4-(aminomethyl)piperizine modified with polyepiiodohydrin.

This polymer was stored in a refrigerator as a water solution. A water solution containing 1.5% of 4-(aminomethyl)piperizine modified polyepiiodohydrin and 0.5% of 4-(aminomethyl)piperizine and a hexane solution containing 0.2% of isophthaloyl chloride were prepared.

The water solution was poured on the flat surface of a polysulfone microporous substrate, which was then placed in a vertical position for 30 minutes to drain off the excess solution. After this, the hexane-isophthaloyl chloride solution was also poured on the substrate and on top of the aqueous solution, causing interfacial polymerization to occur. After 30 seconds, the excess solution was drained in the same manner for 1 minute.

The membrane was then cured in a convection oven at 120° C. for 10 minutes, cross-linking the water-soluble polymer and the monomer. It was cooled at room temperature, and covered by a 1% polyvinylalcohol solution. Excess solution was drained off while maintaining the membrane in a vertical position. The membrane was finally cured at 110° C. in an oven for 10 minutes. The reverse osmosis performance of the resulting composite membrane was measured under the following conditions:

| Pressure: | 56 Kg/cm² |
|---|---|
| Feed solution: | 3.5% NaCl aqueous solution |
| Temperature: | 25° C. |

The composite membrane showed 99.65% salt rejection and 0.35 m³/m² day water flux.

EXAMPLE 2

A solution of 12 grams of polyepiiodohydrin in 50 grams of tetrahydrofuran was added to a solution of 35 grams of 4-(aminomethyl)piperizine in 100 grams of tetrahydrofuran and 10 grams of water. The mixture was stirred at 50° C. for 1 hour. Then the mixture was poured into 500 grams of benzene, after which the precipitate was obtained by decantation, washed with benzene several times and dried at 25° C. for 0.5 hours in vacuum.

The precipitate which contained 4-(aminomethyl)-piperizine modified polyepiiodohydrin and excess 4-(aminomethyl)piperizine was dissolved in water to form a 0.5% aqueous solution. The microporous polysulfone substrate which was prepared separately was coated with the aforementioned 0.5% aqueous solution; after that a 0.2% solution of isophthaloyl chloride in hexane was carefully poured on it. The product was cured at 120° C. for 5 minutes to produce a composite membrane. The performance of this membrane was 0.7 m³/m².day flux and 99.7% salt rejection under the following conditions:

| Pressure: | 40 Kg/cm² |
|---|---|
| Feed solution: | 0.25% NaCl aqueous solution |
| Temperature: | 25° C. |
| pH: | 7 |

The feed pH was changed from 7 to 1, then from 1 to 13, and finally from 13 to 7. The membrane performance was changed as follows:

| pH | Water flux (m³/m² · day) | Salt rejection (%) |
|---|---|---|
| 7 | 0.7 | 99.7 |
| 1 | 0.6 | 50 |
| 13 | 0.7 | 98.6 |
| 7 | 0.7 | 99.7 |

EXAMPLES 3 to 5; COMPARATIVE EXAMPLES 1 to 2

The mix ratio of polymer and 4-(aminomethyl)piperizine in Example 1 was changed; preparation of the membrane was otherwise the same as in Example 1.

Reverse osmosis performance was measured under the same conditions as in Example 1.

| | 4-(aminomethyl) piperizine (%) | Polymer (%) | Salt (%) rejection | Water flux m³/m² · day |
|---|---|---|---|---|
| Examples | | | | |
| 3 | 0.75 | 1.25 | 99.60 | 0.36 |
| 4 | 1.0 | 1.0 | 99.48 | 0.36 |
| 5 | 1.25 | 0.75 | 99.45 | 0.34 |
| Comparative Examples | | | | |
| 1 | 0 | 2 | 92.0 | 0.51 |
| 2 | 2 | 0 | 30.0 | 0.15 |

EXAMPLE 6

FIG. 1 of the drawings represents an electron-microphotograph of the cross section of the composite membrane obtained in Example 1.

The polyvinylalcohol protective layer, the ultrathin solute barrier layer, the intermediate transport layer were observed as in FIG. 1.

EXAMPLE 7

The composite membrane obtained from Example 1 was tested under the following conditions:

| Pressure: | 56 Kg/cm² | |
|---|---|---|
| Feed solution: | sand filtered sea water | |
| Temperature: | from 15° C. to 25° C. | |
| | Salt rejection (%) | Water flux (m³/m² · day) |
| after 10 hours | 99.62 | 0.34 |
| after 1,000 hours | 99.61 | 0.32 |

Then 0.1 ppm of chlorine was added to the feed and the test was continued for 60 hours. The salt rejection value was reduced to 99.58% and the water flux value was reduced to 0.25 m³/m².day. After this the chlorine addition was stopped and the test was continued for 50 additional hours. The salt rejection and flux values were found to have recovered to 99.60% and 0.31 m³/m².day, respectively.

EXAMPLE 8

Stability in hot water and strength for high pressure operation were measured by using the membrane obtained from Example 2 under the following conditions:

| Pressure: | 70 Kg/cm² |
|---|---|
| Feed: | Synthetic sea water |
| Temperature: | 40° C. |
| Operating times: | 300 hours |

-continued

|  | Salt rejection (%) | Water flux (m$^3$/m$^2$ · day) |
|---|---|---|
| 24 hrs. after start of operating | 99.43 | 0.40 |
| 300 hrs. after start of operating | 99.36 | 0.36 |

EXAMPLES 9 to 11 and COMPARATIVE EXAMPLES 3 to 5

Piperazine, 3-(methylamino)hexahydroazepine and 3-(amino)hexahydroazepine were used instead of the 4-(aminomethyl)piperizine of Example 3 and of Comparative Example 2.

|  | Polyamine | Polymer | Salt Rejection | Water (m$^3$/m$^2$ · day) |
|---|---|---|---|---|
| Examples |  |  |  |  |
| 9 | piperazine | same as Ex. 1 | 95.0 | 0.35 |
| 10 | 3-(methylamino) hexahydroazepine | same as Ex. 1 | 98.2 | 0.33 |
| 11 | 3-(amino)hexahydroazepine | same as Ex. 1 | 99.3 | 0.28 |
| Comparative Examples |  |  |  |  |
| 3 | piperazine | none | 75.2 | 0.03 |
| 4 | 3-(methylamino)-hexahydroazepine | none | — | nearly 0 |
| 5 | 3-(amino)hexa hydroazepine | none | 42.3 | 0.04 |

EXAMPLE 12 and COMPARATIVE EXAMPLE 6

An aqueous solution containing 2% polyethyleneimine and an aqueous solution containing 1.2% polyethyleneimine and 0.8% 4-(aminomethyl)piperizine were prepared.

The performance of the membrane made from these solutions, prepared as in Example 1, was measured under the conditions of 40 Kg/cm$^2$, 0.25% NaCl aqueous solution at 25° C.

|  | Polyethyleneimine | 4-(aminomethyl)-piperizine | Salt rejection | Water flux (m$^3$/m$^2$ · day) |
|---|---|---|---|---|
| Example 12 | 1.2 | 0.8 | 99.6 | 0.40 |
| Comparative Example 6 | 2 | — | 97.8 | 0.52 |

EXAMPLE 13 and COMPARATIVE EXAMPLE 7

Polyepichlorohydrin was treated with NaN$_3$ to obtain polyepiazidohydrin, and was then reduced by LiAlH$_4$ to obtain polyepiaminohydrin.

An aqueous solution containing 0.6% polyepiaminohydrin and 0.4% piperazine and an aqueous solution containing 1% polyepiaminohydrin were prepared, respectively.

The performances of the membranes made from these solutions prepared as in Example 1 were measured under the following conditions:

Pressure: 40 Kg/cm$^2$
Feed: 0.25% NaCl
Temperature: 25° C.

|  | Polyepiaminohydrin | Piperazine | Salt rejection (%) | Water flux (m$^3$/m$^2$ · day) |
|---|---|---|---|---|
| Example 13 | 0.6 | 0.4 | 99.66 | 0.40 |
| Comparative Example 7 | 1.0 | — | 97.8 | 0.52 |

EXAMPLE 14 and COMPARATIVE EXAMPLE 8

An aqueous solution containing 1.2% "EPIAMINE" (made by Dow Chemical Co.; ethylene diamine modified polyepichlorohydrin) and 0.8% ethylene-diamine, and an aqueous solution containing 2% "EPIAMINE" were prepared, respectively. The membranes were fabricated as in Example 1. They showed the performance parameters set forth below, under the same conditions as in Example 13.

|  | "EPIAMINE" | Ethylene-diamine | Salt rejection (%) | Water flux (m$^3$/m$^2$ · day) |
|---|---|---|---|---|
| Example 14 | 1.2 | 0.8 | 99.64 | 0.11 |
| Comparative Example 8 | 2.0 | — | 98.7 | 0.11 |

FIG. 2 is an electronmicrophotograph showing the fine structure of the ultrathin cross section of the membrane obtained from Comparative Example 8. The ultrathin solute barrier layer of the membrane is thinner than the membrane of Example 1.

Although this invention has been shown and described with reference to specific examples thereof, many variations may be practiced. For example, the monomeric migration mechanism described in detail herein may be utilized with various chemical structures, so long as the monomer has the capability of penetrating through the barrier to react with further cross-linking agent.

Further, it will now be apparent that the hydrophilic and hydrophobic layers may be reversed, with the organic layer directly applied to the substrate and the aqueous layer applied thereon. Also, while reference has been made to polysulfone as the preferred substrate, other substrates may be substituted.

Other variations may be made, including substitution of equivalents, reversals of steps, and the use of certain features independently of other features, all as set forth in the appended claims.

We claim:

1. A high performance semipermeable composite membrane comprising a microporous substrate having a semipermeable membrane on the surface thereof, the semipermeable membrane being composed of a cross-linked polymer comprising the reaction product of a mixture of (a) a water soluble organic polymer having reactive amino groups in terminal and/or side chains of the organic polymer, (b) a monomeric polyamine, and (c) a cross-linking agent having a group capable of reacting with the reactive groups of the water soluble organic polymer and also of reacting with the polyamine, and of reacting said crosslinking agent with the amino groups of said organic polymer.

2. A high performance semipermeable composite membrane according to claim 1, wherein the water soluble organic polymer has amino groups selected from the group consisting of amine modified polyepihalohydrin, polyethyleneimine and polyepiaminohydrin.

3. A high performance semipermeable composite membrane according to claim 2, wherein the amine modified polyepihalohydrin is a modified polymer made by reacting at least one polyepihalohydrin represented by the Formula (I):

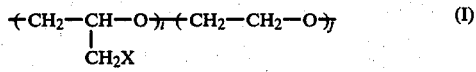

(I)

wherein the X is halogen selected from the group consisting of Cl, Br and I, and i and j are mole fractions and satisfy the following relationships:

$i+j=1$ $0 < i \leq 1$ $0 \leq j \leq 0.8$ with at least one polyamine (II) which is a non-cyclic or cyclic polyamine containing:
(1) from 0 to 1 amino group,
(2) more than 1 imino group, and
(3) the sum of the amino and the imino group(s) is more than 2, wherein the amino group when present is bonded to a carbon atom and the imino group is bonded to a carbon atom or to two different carbon atoms, the total number of carbon atoms being from 3 to 12.

4. A high performance semipermeable composite membrane according to claim 3, wherein the polyamine mixed with the amino modified polyepihalohydrin is at least one of said polyamines (II) defined in claim 4.

5. A high performance semipermeable composite membrane according to claim 3, wherein the polyamine (II) is selected from the group consisting of 4-aminomethylpiperizine, piperazine, 2,5-dimethylpiperazine, 3-methylaminohexahydroazepine and 3-aminohexahydroazepine.

6. A high performance semipermeable composite membrane according to claim 1, wherein the polyamine is selected from the group consisting of cyclic or non-cyclic amino compounds containing from 2 to about 12 carbon atoms.

7. A high performance semipermeable composite membrane according to claim 1, wherein the cross-linking agent has a polyfunctional group selected from the group consisting of acid halides, organic isocyanates and activated halogens having at least two functional groups.

8. A high performance semipermeable composite membrane according to claim 7, wherein the polyfunctional reagent is selected from the group consisting of isophthaloyl chloride, terephthaloyl chloride, trimesoyl trichloride, toluylene diisocyanate, naphthalene diisocyanate and cyanuric chloride.

9. A high performance semipermeable composite membrane according to claim 1, wherein the ratio of contents of the mixture is in the range of about 10% to about 90% by weight of the water soluble organic polymer and about 90% to 10% by weight of the polyamine.

10. A high performance semipermeable composite membrane according to claim 1, wherein the semipermeable membrane has a laminated structure consisting of an ultrathin solute barrier layer and an intermediate transport layer.

11. A high performance semipermeable composite membrane according to claim 10, wherein the ultrathin solute barrier layer has a thickness of about 10 Å to about 1000 Å and the intermediate transport layer has a thickness of about 100 Å to about 3μ.

12. A high performance semipermeable composite membrane according to claim 1, wherein the semipermeable membrane has a thickness of about 100 Å to about 3μ.

13. A high performance semipermeable composite membrane according to claim 1, wherein the microporous substrate comprises an organic polymer selected from the group consisting of polysulfone, chlorinated polyolefine, cellulose acetate and polyvinylchloride.

14. A high performance semipermeable composite membrane according to claim 1, wherein the microporous substrate is reinforced by a reinforcing material selected from the group consisting of calendered woven or non-woven fabric, uncalendered woven or nonwoven fabric, porous film and paper.

15. A high performance semipermeable composite membrane according to claim 1, wherein the semipermeable membrane is protected by a crosslinked polymer selected from the group consisting of polyvinylalcohol, partially saponified polyvinylacetate and polyvinylpyrrolidone.

16. A high performance semipermeable composite membrane according to claim 15, wherein the protective coating has a thickness of about 1,000 Å to about 10 microns.

17. A process for producing a high performance semipermeable composite membrane comprising the steps of:
(a) treating a microporous substrate with an aqueous solution containing at least one water soluble organic polymer having reactive amino groups in terminal and/or side chains of the organic polymer, said solution also containing a monomeric polyamine,
(b) applying to the resulting coated porous substrate a solution which is essentially immiscible with the solution used in step (a) and containing a crosslinking agent capable of reacting with said reactive amino groups of the water soluble organic polymer and also of reacting with the monomeric polyamine, said reactions being effective to form an ultrathin composite film on one surface of the microporous substrate, and
(c) drying the resulting composite semipermeable membrane at an elevated temperature.

18. A process according to claim 17, wherein the water soluble organic polymer is selected from the group consisting of amine modified polyepihalohydrin, polyethyleneimine and polyepiaminohydrin.

19. A process for producing a high performance semipermeable composite membrane according to claim 18, wherein the amine modified polyepihalohydrin is a modified polymer made by reacting at least one polyepihalohydrin represented by the following Formula (I):

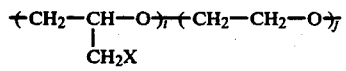

wherein X is halogen selected from the group consisting of Cl, Br and I, and i and j are mole fractions and satisfy the following relationships:

$i+j=1$ $0<i\leq 1$ $0\leq j\leq 0.8$ with a polyamine (II) which is a non-cyclic or cyclic polyamine containing:
(1) from 0 to 1 amino group,
(2) more than 1 imino group, and
(3) the sum of the amino and the imino groups is not more than 2 wherein the amino when present is bonded to a carbon atom and the imino group is bonded to a carbon atom or to two carbon atoms, the total number of carbon atoms being from 3 to 12.

20. A process for producing a high performance semipermeable composite membrane according to claim 14, wherein the polyamine mixed with the amine modified polyepihalohydrin is at least one of the polyamines (II) defined in claim 19.

21. A process for producing a high performance semipermeable composite membrane according to claim 19, wherein the polyamine is selected from the group consisting of 4-aminomethylpiperizine, piperazine, 2,5-dimethylpiperazine, 3-methylaminohexahydroazepine and 3-aminohexahydroazepine.

22. A process for producing a high performance semipermeable composite membrane according to claim 17, wherein the polyamine is selected from the group consisting of cyclic and/or non-cyclic amino compounds containing from 2 to about 12 carbon atoms.

23. A process for producing a high performance semipermeable composite membrane according to claim 17, wherein the polyfunctional reagent is selected from the group consisting of acid halides, organic isocyanates, and activated halogens having at least two functional groups.

24. A process for producing a high performance semipermeable composite membrane according to claim 17, wherein the polyfunctional reagent is selected from the group consisting of isophthaloyl chloride, terephthaloyl chloride, trimesoyl trichloride, toluylene diisocyanate, naphthalene diisocyanate and cyanuric chloride.

25. A process for producing a high performance semipermeable composite membrane according to claim 17, wherein the ratio of contents of the mixture is in the range of about 10% to about 90 by weight of the water soluble organic polymer and about 90% to 10% by weight of the polyamine.

26. A process for producing a high performance semipermeable composite membrane according to claim 17, wherein the concentration of the aqueous solution is in the range of about 0.1% to 10% by weight.

27. A process for producing a high performance semipermeable composite membrane according to claim 17, wherein the concentration of the polyfunctional reagent solution is in the range of about 0.1% to 10% by weight.

28. A process for producing a high performance semipermeable composite membrane according to claim 17, wherein the microporous substrate comprises an organic polymer selected from the group consisting of polysulfone, chlorinated polyolefine, cellulose acetate and polyvinylchloride.

29. A process for producing a high performance semipermeable composite membrane according to claim 17, wherein the microporous substrate is reinforced by a reinforcing material selected from the group consisting of calendered or non-calendered woven or non-woven fabric, porous film and paper.

* * * * *

UNITED STATES PATENT AND TRADEMARK OFFICE
CERTIFICATE OF CORRECTION

PATENT NO. : 4,387,024
DATED : June 7, 1983
INVENTOR(S) : Masaru Kurihara, Tadahiro Uemura and Kiyoshi Okada It is certified that error appears in the above-identified patent and that said Letters Patent is hereby corrected as shown below:

Column 7, line 29, "100A" should read --100Å--

Claim 4, last line, "Claim 4" should read --Claim 2--

Signed and Sealed this

Thirteenth Day of December 1983

[SEAL]

Attest:

GERALD J. MOSSINGHOFF

Attesting Officer  Commissioner of Patents and Trademarks

UNITED STATES PATENT AND TRADEMARK OFFICE
Certificate

Patent No. 4,387,024                                Patented June 7, 1983

Masaru Kurihara, Tadahiro Uemura and Kiyoshi Okada

Application having been made by Masaru Kurihara, Tadahiro Uemura and Kiyoshi Okada, the inventors named in the patent above identified, and Toray Industries, Inc., the assignee, for the issuance of a certificate under the provisions of Title 35, Section 256, of the United States Code, deleting the name of Kiyoshi Okada as a joint inventor, and a showing and proof of facts satisfying the requirements of the said section having been submitted, it is this 17th day of July, 1984, certified that the name of the said Kiyoshi Okada is hereby deleted from the said patent as a joint inventor with the said Masaru Kurihara and Tadahiro Uemura.

Fred W. Sherling,
*Associate Solicitor.*